(12) United States Patent
Eldreth (10) Patent No.: US 6,292,800 B1
(45) Date of Patent: Sep. 18, 2001

(54) DATABASE SYSTEM (75) Inventor: Paul Eldreth, Chantilly, VA (US)

(73) Assignee: America Online, Dulles, VA (US)

(*) Notice: Subject to any disclaimer, the term of this patent is extended or adjusted under 35 U.S.C. 154(b) by 0 days.

(21) Appl. No.: 09/240,144

(22) Filed: Jan. 29, 1999

(51) Int. Cl.[7] .................................................. G06F 17/30
(52) U.S. Cl. ............................ 707/10; 709/201; 709/227; 707/3
(58) Field of Search ......................... 707/10, 3; 709/201, 709/227

(56) References Cited

U.S. PATENT DOCUMENTS

| 4,445,171 | * | 4/1984 | Neches ................................. | 364/200 |
| 5,475,836 | * | 12/1995 | Harris et al. ......................... | 395/600 |
| 5,706,499 | * | 1/1998 | Kleewein et al. .................... | 395/610 |
| 6,012,083 | * | 1/2000 | Savitzky et al. ...................... | 709/202 |
| 6,138,152 | * | 10/2000 | Jalote et al. ......................... | 709/219 |

FOREIGN PATENT DOCUMENTS 0 684 569 A1   11/1995   (EP) .

OTHER PUBLICATIONS

IBM Technical Disclosure Bulletin; "Generic Dynamic SQL Application Programming Interface Set"; vol. 36; No. 8; Aug. 1993; pp. 573–577.
International Business Machines Corporation; "Database Connection Pool Management"; 1724/Research Disclosure; Dec. 1998.

* cited by examiner

Primary Examiner—Hosain T. Alam
Assistant Examiner—Joon Hwan Hwang
(74) Attorney, Agent, or Firm—Fish & Richardson P.C.

(57) ABSTRACT

A database access method includes receiving a data request at a switcher system from another computer, selecting a connection to a database system from among a collection of connections, and communicating with the database system across the selected connection to fulfill the data request. A computer program residing on a computer readable medium includes instructions for causing a computer to receive a data request from another computer, select a connection to a database system from among a number of connections to the database system, and communicate with the database system across the selected connection to fulfill the data request. A network of interconnected computing devices may include network elements configured by the computer program to implement the invention.

17 Claims, 5 Drawing Sheets

DATABASE SYSTEM

BACKGROUND

A computer application can store and access data by sending queries to, and receiving replies from, a database system. As an application's storage or query processing requirements increase, a single database system may be unable to adequately support the application. In such a case, the application may use multiple database systems. Each database system can store a portion of the data needed by the application. An application may then distribute its queries among the multiple database systems, thus enabling a larger volume of queries to be processed.

To support multiple databases, an application may need to be programmed with knowledge of the various database systems and the distribution of its data among those systems. Such programming may complicate application development and may complicate reconfiguration of the database systems. Consequently, improvements in the use of multiple database systems are desired.

SUMMARY

In general, in one aspect, the invention features a database access method. The method includes receiving a data request at a switcher system from another computer, selecting a connection to a database system from among a collection of connections, and communicating with the database system across the selected connection to fulfill the data request.

Implementations may include one or more of the following features. Communicating with the database system may include sending a database query and receiving a reply to the query. The database query can be generated by processing the data request message at a message processing library that is selected based on an identity value in the data request. The switcher may be configured to process messages by attaching a message process library corresponding to different data request identifier values. The switcher may receive data requests from multiple computers and service the data requests on different connections to the database system. The order in which various data requests are received, and in which they are fulfilled, may differ.

In general, in another aspect, the invention features a computer program residing on a computer readable medium. The program includes instructions for causing a computer to receive a data request from another computer, select a connection to a database system from among a number of connections to the database system, and communicate with the database system across the selected connection to fulfill the data request.

Implementations may include one or more of the following features. The program may include instructions to send a database query and instructions to receive a reply to the database query on the selected connection. The program may also include instructions to send the data request to a request message processing library based on an identity value in the received data request and instructions to process the data request using the selected message processing library to generate the database query.

Implementations may provide advantages including increased total data storage volume, improved transaction processing response time, simplified database access, and increased service availability.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
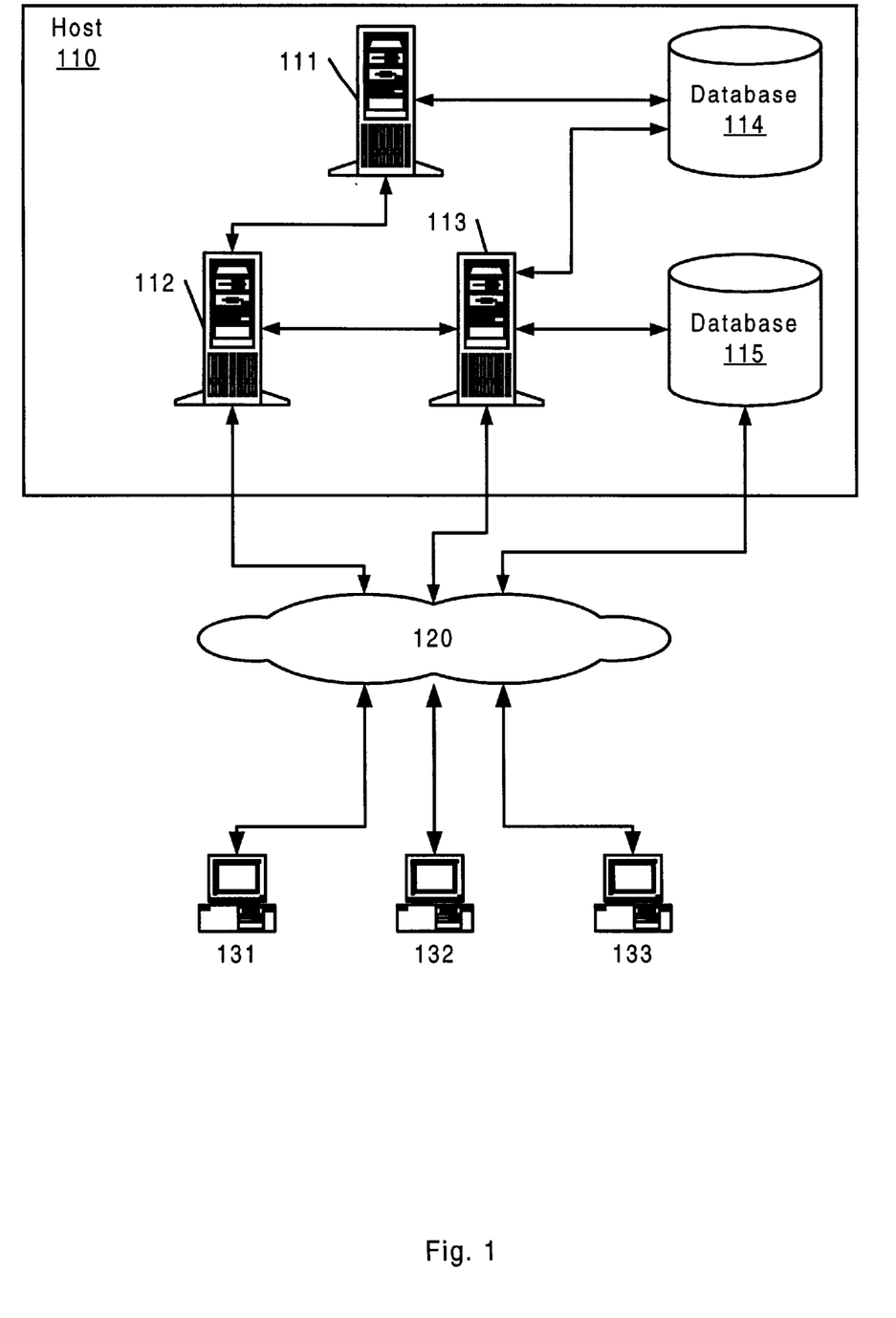
FIG. 1 is computer network.

FIG. 1 shows a network configuration 100 in which a host computer system 110 communicates with client computers 131–133 over a network 120. The host system 110 may include multiple computers 111–113 and database systems 114–115 that work together to provide information services and/or data to client computers 131–133 at various physical locations. The network 120 may be a private network, such as a local area network, a public network, such as the Internet, or may include a combination of public and private network facilities. Components 111–115 of the host system 110 can be located at one or more physical locations and connected by the network 120 or by other communications links. Each database system 114 and 115 will typically include both transaction processing and data storage subsystems.

A host system can include both logic and data needed to implement an information service and to provide that service to users at client computers. For example, America Online, Inc. (AOL), operates a host system that includes "buddy list" application servers. An AOL buddy list application server is a computer system executing software procedures to implement a notification service. The buddy list notification service alerts AOL users when other AOL members on their user-specified lists of member are simultaneously accessing the AOL host system.

Application servers may store, access, and manipulate data in local or remote database systems. For example, data needed by buddy list application servers can be stored at remote database systems accessible over a TCP/IP network, such as the Internet or a private TCP/IP network. Data needed by a particular application server may also be stored, accessed, and manipulated by other application servers. Thus, an AOL buddy list application server may periodically access a list of on-line members stored at a remote database by other types of application servers executing at other application server computers.

Application servers may generate a large number of database transactions and may need to access large volumes of stored data. Data storage and/or transaction processing requirements of an application server may exceed the capabilities of a single database system. Consequently, multiple database systems may be required to store data needed by a single application server. Other transaction processing considerations, such as fault tolerance and transaction processing speeds, may also favor the use of multiple database systems to store data needed by a single application server.

Figure 2:
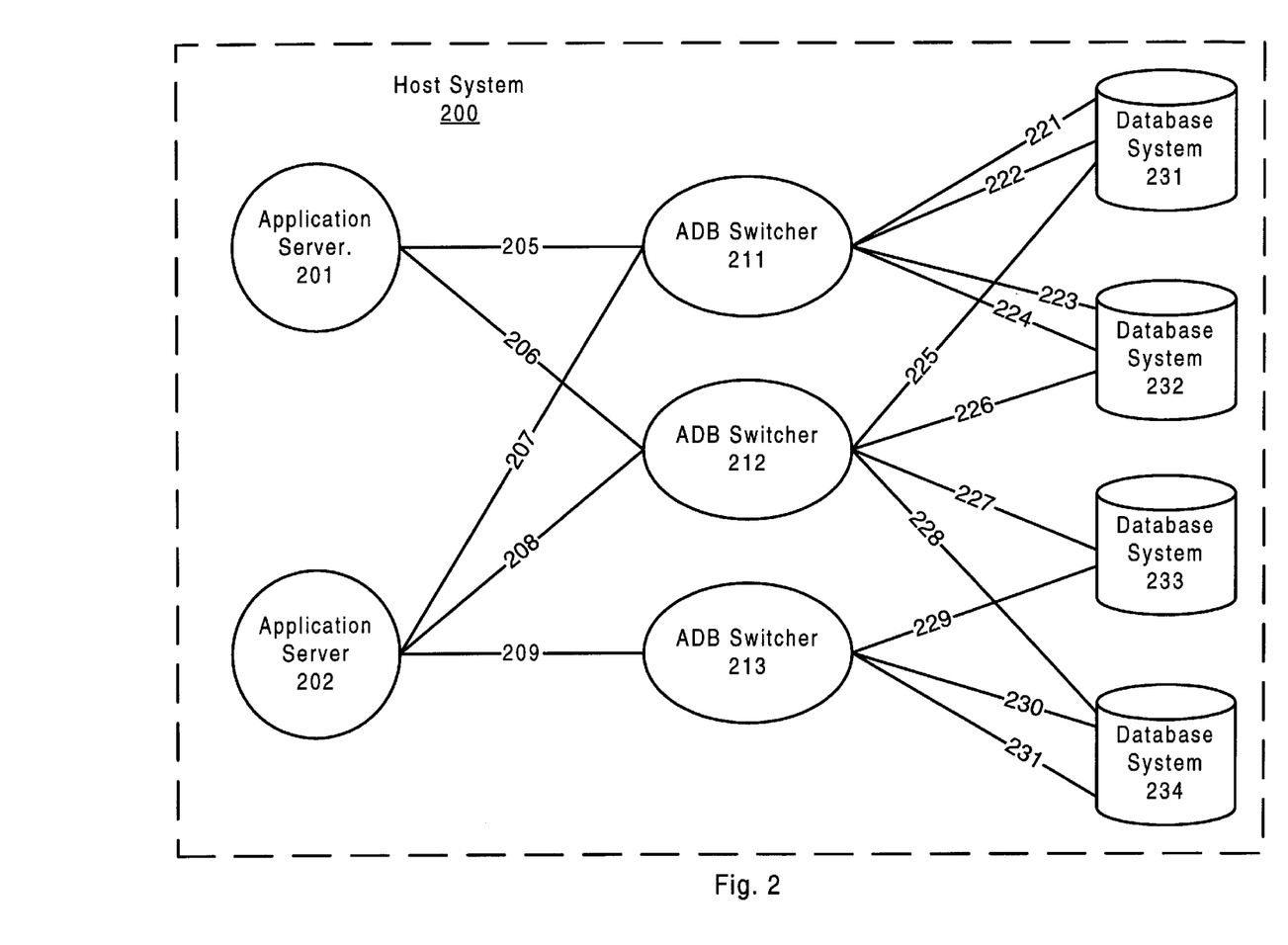
FIG. 2 is a host system.

Shown in FIG. 2 is a host system 200 that includes multiple database systems 231–234. Each database system 231–234 can be implemented using custom or commercially available computer hardware and software. For example, each database 231–234 can include a single, clustered, or multi-processor UNIX®, Linux, or Microsoft Windows NT®-based computer executing a Sybase, Informix, or Oracle relational database. Host system 200 also includes application servers 201 and 202 and asynchronous database switcher servers ("ADB switchers") 211–213. Each application server 201–202 implements information service logic. ADB switchers 211–213 enable indirect data exchanges between the application servers 201–202 and the database systems 231–234.

Data needed by an application server 201–202 may be partitioned over, and/or replicated on, multiple database systems 231–234. For example, if application server 201's data storage and transaction requirements exceed the storage capacity or transaction processing capabilities of a single database system 231, then application server 201's data may be partitioned over multiple database systems 231 and 232. Those partitions may be further replicated at additional database systems 233 and 234.

Asynchronous database switcher servers ("ADB switchers") 211–213 can provide an interface for indirect data exchanges between the application servers 201–202 and the database systems 231–234. The indirect interface provided by the ADB switchers 211–213 lo enables the partitioning, replication, and transaction processing details performed by the database systems 231–234 to be hidden from the application servers 201–202. Thus, if the data created and accessed by application server 201 is partitioned over databases 231–232, the application server 201 need not be aware of that partitioning. Instead, application server 201 may store, retrieve, and/or manipulate data by sending a data request to the database interface implemented by ADB switcher 211. Thus, from the perspective of application server 201, ADB switcher 211 is the host system 200 element at which data is stored or from which data is retrieved. ADB switcher 211 can, in turn, process a data request from an application server, select a destination database system 231–232 based on that data request processing, send a database query to, and receive a query reply from, the selected database system, format a data response based on the query reply, and return the data response to the application server 201.

Figure 3:
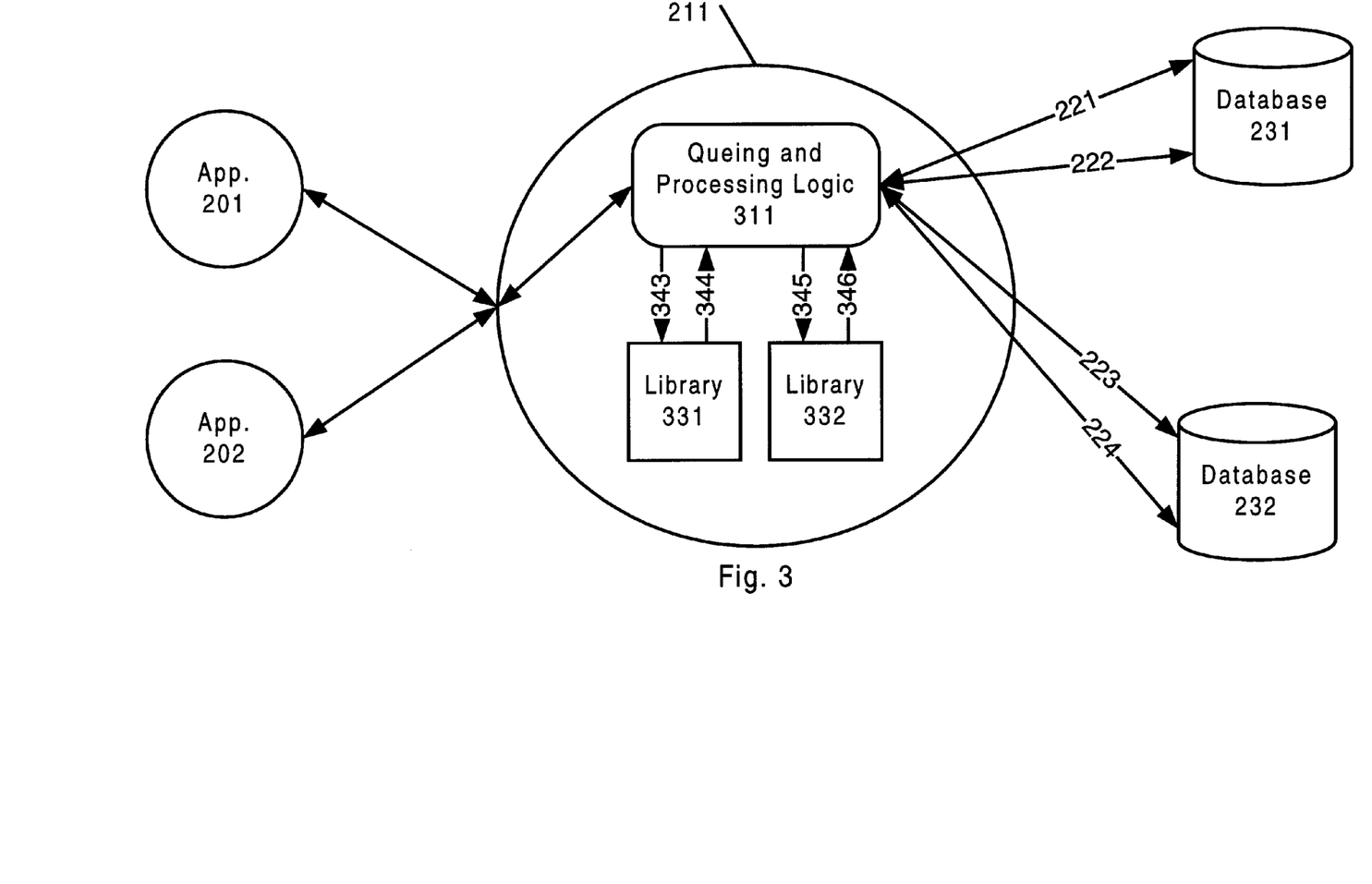
FIG. 3 shows details of a host system.

FIG. 3 shows additional details of ADB switcher 211. ADB switcher 211 includes request queuing and forwarding logic 311. An ADB switcher may also include one or more application server-specific message processing libraries. For example, the ADB switcher 211 is shown having two message processing libraries 331 and 332. Each library 331 and 332 can include dynamically loaded program code that implements functions used to process data requests from particular application servers, interact with database systems 231–234, and generate replies to particular application servers 201 or 202. Functions implemented by libraries 331 and 332 may include queuing request messages from application servers 201–202, generating database system 231–234 queries based on received request messages, and determining particular database systems 231–234 to receive queries. Libraries 331–332 may also receive query responses from the database systems 231–234, format responses to the application servers 201–202 based on the query responses, and send the responses to the application servers 201–202.

Message processing libraries 331–332 may be implemented in dynamically linked shared program code files. In a UNIX®-based implementation, ADB switcher logic 311 can call UNIX operating system functions to attach the shared program code files containing the libraries 331 or 332. For example, in UNIX-based Solaris®, Irix®, and Linux® operating systems, operating system function calls "dlopen" and "dlsym" can be used to attach the shared library files. In other implementations, message processing libraries 331–332 may be implemented as statically linked program code or by an interpreted scripting language, such as JavaScript®, Toolkit Command Language (TCL), or the BASIC programming language. Message processing libraries 331–332 may also be implemented as separately executing application operatively linked to ADB switcher logic 311 using inter-process communications functions. Still other function library attachment implementations may be used.

Data exchanged between an application server 201 and an ADB switcher 211, and between ADB switcher 211 and database systems 231–234 may differ in format and protocol. For example, a data request from application server 201 may be formatted as a message containing the message fields shown in Table 1, and a data reply from ADB switcher 211 to application server 201 may be formatted as a message containing the fields shown in Table 2. As further described below, request messages having the format shown in Table 1 may be received from an application server by ADB logic 311, sent to a message processing library 331 or 332 wherein structure query language (SQL) query messages corresponding to the request are produced, and the SQL query messages may then be sent to selected database systems 231–234. Correspondingly, SQL responses from the database systems 231–234 may be processed by a message processing library 331 or 332 to produce result messages having the format shown in Table 2.

TABLE 1

Request Message Format.

| Field: | Function |
|---|---|
| <ID> | The <ID> field includes a numeric identifier that is used by an ADB switcher to identify associations between application servers, message processing libraries, and database systems. An application may have different <ID> values that are associated with different aspects of application server functionality. In general, each <ID> value is uniquely associated with an application server within a host system. |
| <method> | The <method> field contains a numeric identifier indicating a database operation to be performed. For example, an application server may use the following identifiers to indicate operations to be performed: |
| | <method> value    Operation indicated |
| | 0    Delete database values |
| | 2    Query database values, |
| | 4    Update database values. |
| <correlation ID> | The <correlation ID> field contains a value used to correlate request and In general, each outstanding request associated with a particular <ID> value will have a unique <correlation ID> value associated with it. A <correlation ID> may be in any form selected by an application server designer. |
| <variable> | The <variable> field contains additional data that may be used by an ADB switcher to form a query to implement the database function identified by the <method> field. The <variable> field is application server specific. It may contain additional sub-fields and may be a fixed or variable length, The <variable> field may contain any data that an application server designer wishes to provide to a message processing library. |

TABLE 2

Result Message Format.

| Field: | Function |
|---|---|
| <ID> | The <ID> field includes a numeric identifier that is used by an ADB switcher to identify associations between an application server, message processing libraries, and database systems. An application may have different <ID> values that are associated with different aspects of application server functionality. In general, the <ID> value in a result message is copied from a corresponding request message and may be used by an application server to identify an aspect of server functionality that thye result message is associated with. |
| <method> | The <method> field contains a numeric identifier indicating a database operation to be performed. For example, an application server may use the following identifiers to indicate operations to be performed: |

| <method> value | Operation indicated |
|---|---|
| 1 | Delete database balues |
| 3 | Query database values, |
| 5 | Update database values. |

| <status> | The <status> field provides additional details on a requested database operation: |
|---|---|

| <status> value | Operation indicated |
|---|---|
| 0 | Result ok. |
| 1 | Database is not accessible. |
| 2 | Requested database is not active |
| 3 | Requested method resulted in database error |
| 4 | Field specification erroneous. |
| 5 | Unknown database requested. |
| 6 | Unknown database method requested. |
| 7 | Key required for specified method. |
| 8 | No results were produced. This may be the intended result. |
| 9 | Result is too long. |
| 10 | Request timed out. |
| 11 | Request deadlocked and was terminated. |

| <correlation ID> | The <correlation ID> field contains a value used to correlate request and result messages sent between an applications server and an ADB switcher. The <correlation ID> value in a result message is copied from the <correlation ID> value in a corresponding request message. |
|---|---|
| <result> | The <result> field contains additional data that may be returned to an application server. Typically, the result field will be based on query response data returned to an ADB switcher from a database system. For example, the <result> field may contain a table of values retrieved in response to a database query. The <result> field is application server specific. It may contain additional sub-fields and may be a fixed or variable length. The <result> field may be in any format defined by an application server and a message processing library designer. |

Figure 4A:
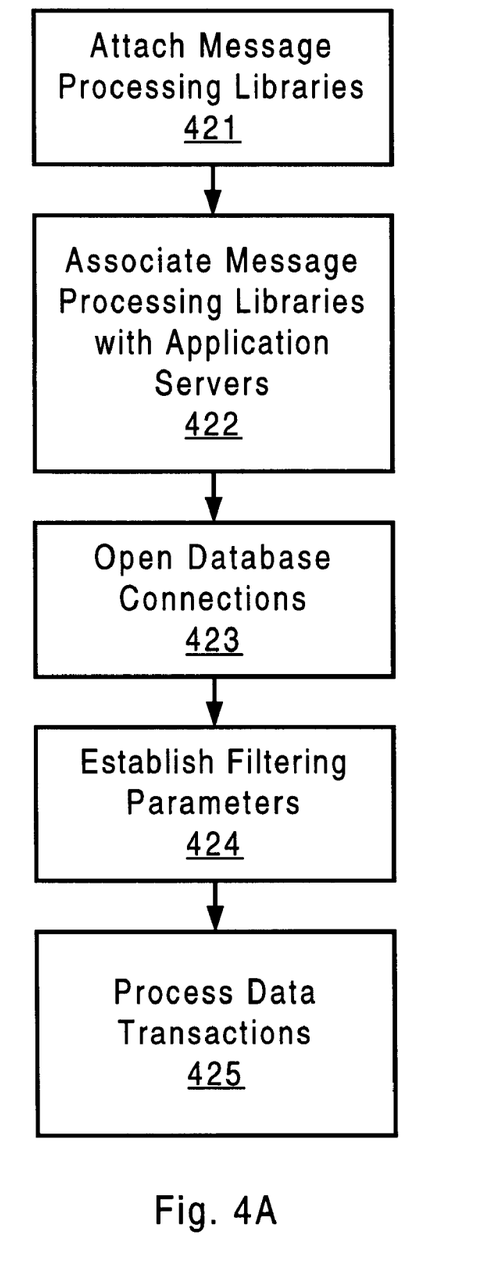
FIGS. 4A, 4B, and 4C are flowcharts depicting host system processes.

The operation of an ADB switcher 211 and the processing of exemplary request and result messages is further described with reference to FIGS. 3, and 4A–4C. FIG. 4A shows an ADB Switcher configuration routine. Configuration data accessed by ADB Switcher logic 311 can include a series of "attach" directives. Each "attach" directive instructs the logic 311 to attach a message procesing libraries (step 421). Multiple "attach" directives, or "attach" directives with extended parameter sets, may be used to attach multiple message processing libraries. The format of configuration data may be implementation-defined. In an exemplary implementation, the following format can be used for an "attach" directive:

Attach <library name> <ID> <functions> where <library name> <ID> and <functions> are parameters of the attach directive. These prameters may be defined as follows:

<library name>

The <library name> parameter identifies a message processing library file.

<ID>

The <ID> parameter contains a numeric identifier used to correlate messages from application servers with particular message processing library files. Logic 311 may store data defining relationships between <ID> values and message processing libraries (step 422). For example, for each "attach" directive processed, an <ID> value and a <library name> value may be stored as a record in a database table maintained at the ADB switcher 211. When a message is received from an application server, logic 311 can retrieve the stored relationship data to identify which message processing library is to process the received message.

<functions>

The <functions> parameter further defines the interface between the ADB switcher logic 311 and the message processing library 331. The <functions> parameter may identify software procedures within the library 331 that perform particular functions required by ADB switcher logic 311. For example, the logic 311 may need to access the following functions in every message processing library: 1) an "open" function to establish connections to database systems, 2) a "close" function to close previously opened database connections, 3) a "format" function to format database queries and to compatibly exchange data between application servers and database systems. Implementations may also require additional interface functions to be defined. For example, an implementation may require a "schedule" interface functions to control request and database query scheduling, and a "close" interface function to close previously opened database connections.

Each message processing library attached by a host system may use unique names for such "open," "close", and "format" functions. Unique names may be required to prevent name conflicts when multiple message processing libraries 331 and 332 are attached and integrated with the switcher logic 311. For example, "open," "close", and "format" functions in library 331 may have software procedure names "app201open," "app201close," and "app201format", respectively, while corresponding functions in library 332 may have software procedure names "app202open," "app202close," and "app202format."

ADB switcher configuration data may also be used to determine the number of database connections between an ADB switcher and each database system. Each connection may correspond to an independently operating database system "login." For example, the ADB switcher 211 may have two connections 221–222 to database system 231 and two connection 223–224 to database system 232. Each connection 221–224 may support a single outstanding database query. Therefore, the database system 231 must reply to a query received on connection 221 before another query can be received on that connection. However, other queries may be simultaneously outstanding on other database connections. Thus, a database system 231 having two connections 221–222 can support two simultaneous queries.

Data needed by an application server 201 may be partitioned over multiple database systems 231 and 232. ADB switcher 211 may have different connections used to access data in different partitions or at different database systems. For example, connections 221 and 222 may be used to access a first data partition at database system 231 and connections 223 and 224 may be used to access a second data partition at database system 232.

Configuration data used to configure logic 311 and message processing libraries 331–332 can include a series of "db_open" directives that specify connections to be opened between an ADB switcher system 211 and various database systems (step 423). Each "db_open" directive may also include data to specify the location and contents of particular data partitions. In an exemplary implementation, the following format can be used for "db_open" directives:

db_open <ID> <database name> <connections> <filter> where <ID> <database name> <connections> and <filter> are parameters of the "db_open" directive. These parameters may be defined as follows:

<ID>

The <ID> parameter can be used to identify a previously attached message processing library. The identified message processing library may assist in the processing of the "db_open" directive. For example, logic 311 may maintain a database storing relationships between <ID> values and message processing libraries (as defined during step 422). To process "db_open" directives, logic 311 may identify a message processing library using the database of stored <ID>-to-library relationships and forward the "db_open" directive and/or its parameters to the identified library. As further described below, the library receiving the "db₁₃ open" directive and/or "db_open" parameters may then open a specified number of database connections to a specified database system.

<database name>

The <database name> parameter identifies a database system and/or particular data stored at a database system. The <database name> parameter may include multiple sub-parameters. For example, <database name> may include a system 231–234 identification sub-parameter and parameters identifying particular tables or data structures within the identified database system 231–234.

<connections>

The <connections> parameter specifies a number of database connections to be established between by the ADB switcher and a database system identified by the <database name> parameter. The connections may be established under control of a message processing library or logic 311. Implementations may allow specialized connection types, such as read-only and update-only connections to be individually specified.

<filter>

The <filter> parameter may be used by a message processing library to determine the query handling capabilities of connections being opened to the data or database system specified by the <database name> parameter.

The use of "attach" and "db_open" directives is further described with respect to the exemplary sequence of directives shown in Table 3.

TABLE 3

Exemplary EDB Switcher Configuration Data attach library331.dll 201 app201open app201close app201format
db_open 201 database231 2 "A–M"
db_open 201 database232 2 "N–Z"

The "attach" and "db_open" directives shown in Table 3 attach a message processing library 331 to the ADB switcher logic 311 and configure the library 331 and logic 311 to process messages to and from application server 201. More particularly, the "attach" directive instructs logic 311 to attach a message processing library file named "library331.dll" (step 421) and to use that library to process messages having an <ID> parameter value of 201 (step 422). The "attach" directive also identifies three functions "app201open" "app201close" and "app201format") that implement an interface between logic 311 and library 331. The identified functions may correspond to the "open," "close," and "format," interface functions previously described.

Each "db_open" directive includes an <ID> parameter to identify an associated message processing library. For example, since each "db_open" directive in Table 3 specifies an <ID> value of '201,' and the message processing library "library331.dll" was attached using an <ID> value of 201, each "db_open" directive is associated with the message processing library 331. The "db_open" parameters <ID> <database name> <connections> and Filter> may be sent from logic 311 to library 331 ("library311.dll") using the "app201open" function implemented by the library 331. The "app201open" function may open a number of connections specified by the <connections> parameter to the database identified by the <database name> parameter (step 423).

A "db_open" directive can specify a <filter> parameter to identify queries that can be made on the connections opened by that "db_open" directive (step 424). For example, the first "db_open" directive in Table 3 may cause two database connections 221 and 222 to be opened to database system 231 and can specify the filter condition "A–M" for those conditions. The "A–M" filter condition may indicate that an "A–M" data partition is accessible via connections 221 and 222. Similarly, the second "db_open" directive may cause two database connections 223 and 224 to be opened to database system 232 and can specify the filter condition "N–Z" for those conditions. The "N–Z" filter condition may indicate that an "N–Z" data partition is accessible via connections 223 and 224. The meaning of particular specified <filter> parameter information is determined by the implementation of the receiving message processing library.

Figure 4B:
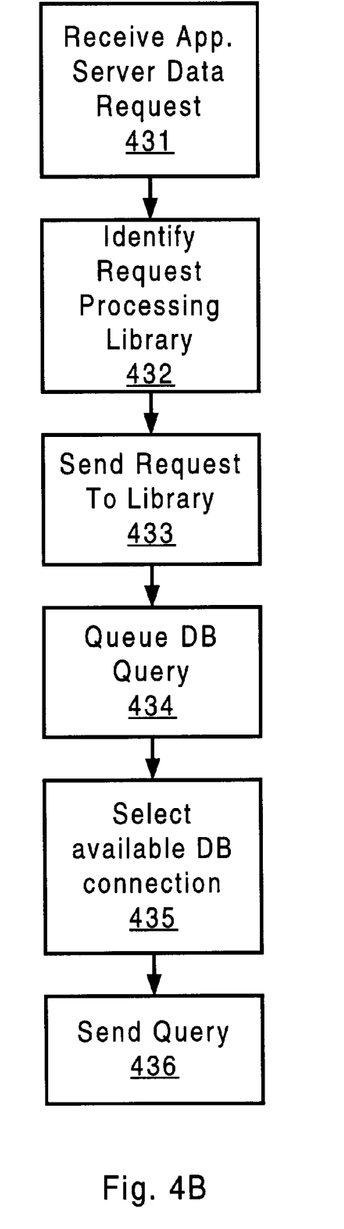

After the ADB switcher has been configured, an application server data request may be processed using the attached shared library (step 425). FIG. 4B outlines an exemplary request message processing procedure. When a request message is received at the logic 311 from an application server 201 (step 431), the <ID> value in the request message is used to determine a message processing library that can process the request message (step 432). The determination may be made using <ID> and <library name> relationship data stored during switcher configuration (step 422 of FIG. 4A). The request message may then be forwarded from the logic 311 to the message processing library (step 433). The message processing library may use application server-specific algorithms to form a database system query based on parameters of the request message. The formed query may be returned to the logic 311 where it is queued for sending to a database system (step 434).

Logic 311 may maintain a number of separate query queues. Each queue may be associated with a different database system 231–234, with different connections to those database systems, with particular groups of connections to those database systems, or with different database operations. The queue in which a particular query is place may be identified by the library 331 based on implementation-specific filter conditions identified by a "db_open" directive <filter> parameter. For example, a query needing to access data in database system 231 may be placed into a first queue coupled to connections 221 and 222 while a query needing to access data in database system 232 may be placed into a second queue coupled to connections 223 and 224. When the query is queued, the <ID> value associated with the message processing library, and the <correlation ID>from the application server's original message is associated with the queued data. Queuing algorithms in the logic 311 monitor the status of each queue. When a connection 221–224 serving that queue is available (step 435), the logic 311 associates the query's <ID> value and <correlation ID> with that connection and sends the query on that connection to a database system. The query's <ID> and <correlation ID> values can be used to correlate subsequently received query replies with request messages.

Figure 4C:
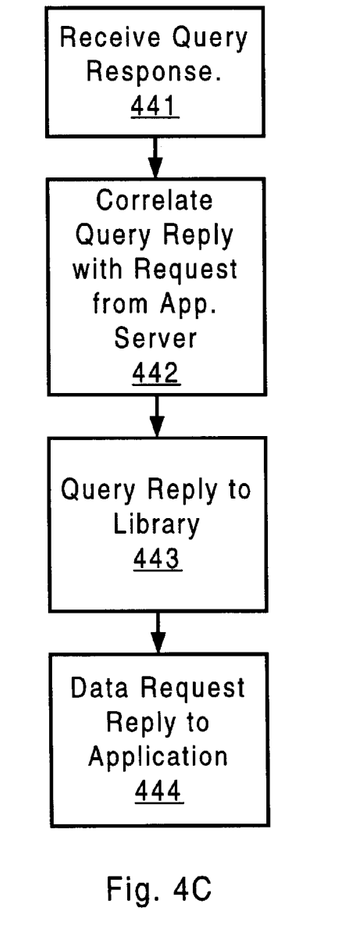

Referring to FIG. 4C, after sending a query to a database systems, an ADB switcher 211 will receive a query response from the database systems (step 441). The logic 311 may send the query response, as well as the <ID> and <correlation ID> associated with the received query's connection, to a message processing library for processing into a response message (see Table 2) (step 444).

An application server may have multiple outstanding request messages. Various ADB switcher 211 processing factors, such as queue use and the speed of different database systems 231–234, may alter request message and response message orders. An application server can correlate particular response messages with their corresponding requests messages using <ID> and <correlation ID>. In general, a response message will return the same or a determinable variant of the <ID> and <correlation ID> values sent in a corresponding request message. The format and use of <correlation ID> values is application-server specific. An ADB switcher may pass <ID> and <correlation ID> values between ADB switcher functions such that <ID> and <correlation ID> values in request and response messages will be the same or will be variants determinable by an application server.

Implementations of the invention may also use replicated databases to process request messages from an application server. For example, each of database systems 231 and 232 may store a full copy of a particular database. The application server 211 may open connections to each database system 231 and 232 and divide queries among the systems 231 and 232 to increase the total number of transactions that can be handled. Implementations may also combine partitioned and replicated databases.

Multiple ADB switchers may be used to process request from a single application server. For example, if the number of data requests generated by an application server sexeeds the processing capability of a single ADB switcher, the application server may be programmed to "round-robin" or otherwise distribute data requests among multiple ADB switchers. Different <ID> values may be associated with each of the multiple different ADB switchers. Additionally, the multiple ADB switchers may each attach a copy of a common message processing library to process messages from the application server. An application server may also send requests associated with different types of data to different ADB switchers or to a common ADB switcher using different <ID> values for each of the different types of data.

Application server to ADB switcher request and response messages need not use the format shown herein. Other implementation-defined formats may be used.

An ADB switcher may access configuration data in a locally stored data file, in a remote database, by commands entered at a local or remote configuration terminal, or by other means.

Implementations may also include client computers configured to send data requests directly to ADB switchers and to receive response messages directly from ADB switchers.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Accordingly, other implementations are within the scope of the following claims.

What is claimed is:

1. A database access method, the method comprising:
   receiving at a switcher system, a data request from a computer;
   selecting a connection to a database system from among a plurality of connections to the database system;
   communicating with the database system across the selected connection to fulfill the data request;
   sending the data request to a request message processing library based on an identity value in the received data request; and
   processing the data request using the selected message processing library to generate a database query.

2. The method of claim 1, wherein communicating comprises sending the database query and receiving a reply to the database query on the selected connection.

3. The method of claim 1, wherein the request message processing library comprises program code to configure the switcher system to process the data request.

4. The method of claim 1, wherein the data request comprises an identity value, and the method further comprising selecting the request message processing library from a plurality of message processing libraries based on the identity value.

5. The method of claim 4, wherein the switcher system comprises a computer executing request message processing software, and the method further comprising configuring the switcher system by operatively attaching each of the plurality of request message processing libraries to the request message processing software.

6. The method of claim 1, the method comprising:
receiving another data request from another computer;
selecting another database connection from among the plurality of database connections; and
communicating with the database system across the other database connection to fulfill the other data request.

7. The method of claim 6, wherein an order in which the data request and the other data request are received differs from an order in which the data request and the other data request are fulfilled.

8. A database access method, the method comprising:
receiving a plurality of data requests at a switcher system;
forming a plurality of database queries by processing the data requests using a message processing library, each database query corresponding to one of the data requests;
selecting one of a plurality of database connections for each of the plurality of database queries; and
sending each query and receiving a reply to each query on the database connection selected for the query,
wherein a first one of the plurality of queries and a second one of the plurality of queries are sent on a same one of the plurality of database connections.

9. The method of claim 8, wherein the second one of the queries is sent after receiving a reply to the first one of the queries on the same database connection.

10. The method of claim 9, the method further comprising:
queuing the second query until a reply to the first one of the queries is received.

11. The method of claim 8, wherein receiving the plurality of data requests comprises receiving each of the data requests from an application server.

12. The method of claim 11, the method further comprising:
forming a plurality of data responses, each data response comprising data from a reply to a query; and
sending the data response to the application server associated with the query.

13. A computer program residing on a computer readable medium, the program comprising instructions for causing a computer to:
receive a data request from another computer;
select a connection to a database system from among a plurality of connections to the database system;
communicate with the database system across the selected connection to fulfill the data request;
send the data request to a request message processing library based on an identity value in the received data request; and
process the data request using the selected message processing library to generate a database query.

14. The program of claim 13, wherein the instructions to communicate comprise instructions to send the database query and instructions to receive a reply to the database query on the selected connection.

15. The program of claim 13, wherein the data request comprises an identity value, and the program further comprising instructions to select the request message processing library from a plurality of message processing libraries based on the identity value.

16. A network of interconnected computing devices, the network comprising:
a database system comprising communications link interface circuitry to receive data queries from a plurality of database connections and to send query replies on the database connections; and
a data request switching system comprising:
a first communications link interface circuitry operatively coupled to the communications link interface circuitry of the database system to send queries to and receive replies over the plurality of database connections;
a second communications link interface circuitry operatively coupling the data request switching system to a computer network and configured to receive data requests and send data responses over the computer network;
a processor coupled to the first communications link interface circuitry, to the second communications link circuitry, and to memory circuitry, the memory circuitry comprising stored program instructions for causing the processor to receive a data request over the second communications link interface from a computer, process the data request using a message processing library, select a connection to a database system from among the plurality of connections, and communicate with the database system across the selected connection to fulfill the data request,
wherein a first query and a second query are sent on a same one of the plurality of database connections.

17. The network of claim 16, the network further comprising a plurality of client computer systems each comprising:
a communications link interface operatively coupled to the second communications link interface circuitry of the data request switching system; and
a processor operatively coupled to the communications link interface to send the data request over the communications link interface to the data request switching systems and to receive data responses over the communications link interface.

* * * * *